United States Patent [19]

Foster et al.

[11] 4,220,365
[45] Sep. 2, 1980

[54] VEHICLE BODY MOLDING ASSEMBLY

[76] Inventors: Marvin L. Foster; Keith D. Foster, both of 10005 E. Burnside St., Portland, Oreg. 97216

[21] Appl. No.: 959,228

[22] Filed: Nov. 9, 1978

[51] Int. Cl.³ .......................................... B60R 19/00
[52] U.S. Cl. ................................................. 293/128
[58] Field of Search ....................... 293/128, 127, 126

[56] References Cited

U.S. PATENT DOCUMENTS

| 3,572,799 | 3/1971 | Truesdell et al. | 293/128 |
| 3,752,521 | 8/1973 | Lafebre | 293/128 |

*Primary Examiner*—John J. Love
*Assistant Examiner*—Norman L. Stack
*Attorney, Agent, or Firm*—Eugene M. Eckelman

[57] ABSTRACT

An elongated base member terminates in end tips having inwardly facing walls, and a flexible molding strip is arranged to be snapped into and anchored in the base member. The structure for holding the flexible molding strip on the base member includes barbs at each end adjacent to the inwardly facing walls. The arrangement is such that these barbs extend into the molding strip when the latter is snapped into place and hold the ends of the strip adjacent to the inwardly facing walls regardless of contraction forces acting on the molding strip as a result of temperature changes.

3 Claims, 6 Drawing Figures

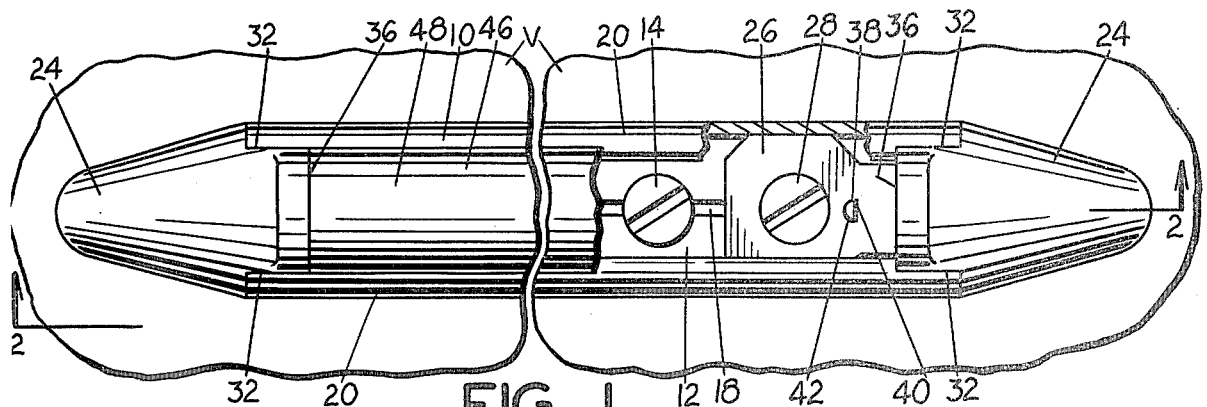
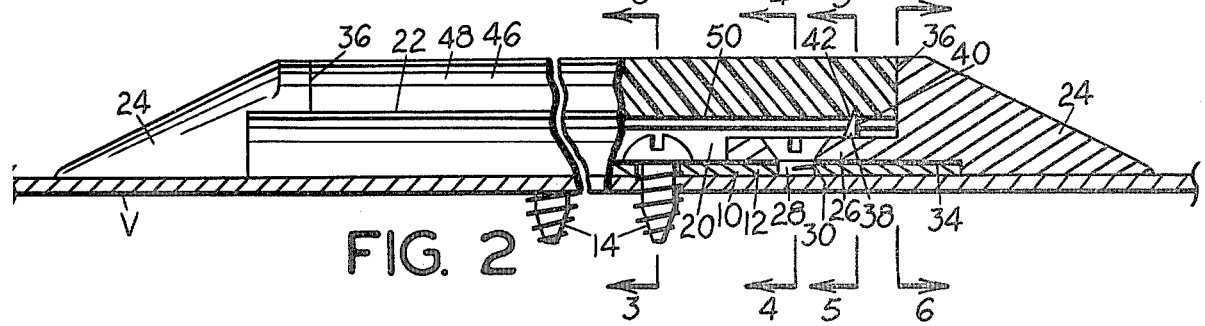
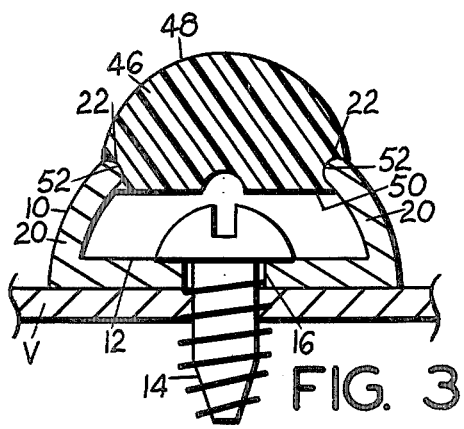
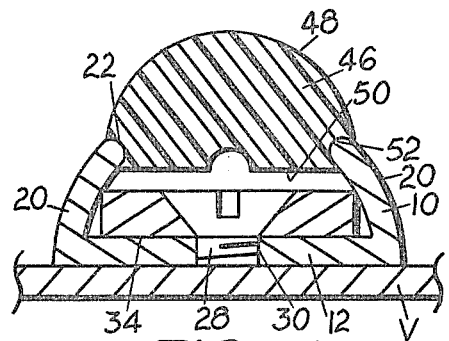
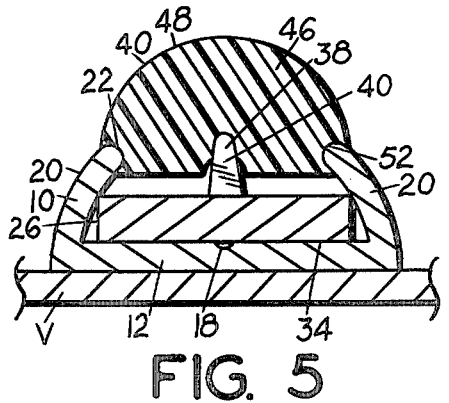
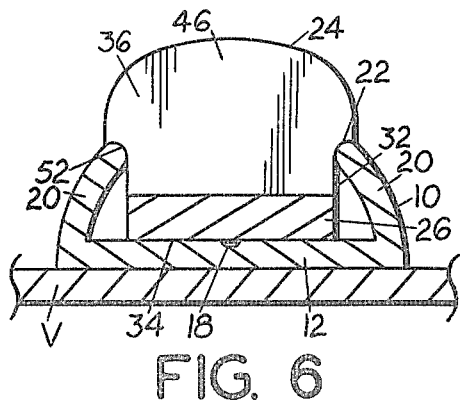

VEHICLE BODY MOLDING ASSEMBLY

BACKGROUND OF THE INVENTION

This invention relates to new and useful improvements in vehicle body molding assemblies.

Various types of molding strips and assemblies of structure have been secured to vehicle bodies along the sides for ornamentation purposes and also for protecting the vehicle body from damage by other vehicle doors. One such assembly includes an elongated base member having tip ends and also having an elongated plastic molding strip arranged to be secured thereto which terminates at the end tips. This type of structure is not satisfactory because gaps appear between the plastic strip and the tip ends upon changes in temperature, or conversely, the strip may bulge. That is, if the molding strip is inserted at the proper length at room temperature, it will either pull away at the ends at cooler temperatures to leave gaps between the ends of the strip and the end tips or it will buckle between its ends at warmer temperatures.

SUMMARY OF THE INVENTION

According to the present invention and forming a primary objective thereof, a vehicle body molding assembly is provided which will not change in appearance or in its connected structure due to changes in temperature.

In carrying out objectives of the invention, the molding assembly employs an elongated base member terminating in end tips having inwardly facing wall portions. An elongated flexible molding strip has removable mounting on the base member. Anchor means in the form of barbs on the tip ends of the base member are arranged to extend into the flexible molding strip when it is mounted in place whereby the ends of the molding strip are held closely adjacent to the wall portions of the base member regardless of contraction forces acting on the molding strip as a result of cooling temperature changes. Also in carrying out the invention, the molding strip can be expanded in length as it is applied to the base member, thus preventing it from buckling between the ends due to expansion forces acting on the molding as a result of warming temperature changes.

The invention will be better understood and additional objects and advantages will become more apparent from the following description.

BRIEF DESCRIPTION OF THE DRAWINGS

FIG. 1 is a foreshortened elevational view of a vehicle body molding assembly embodying features of the present invention, a portion of this view being broken away;

FIG. 2 is a longitudinal off-set sectional view taken on the line 2—2 of FIG. 1; and FIGS. 3, 4, 5 and 6 are enlarged sectional views taken on the lines 3—3, 4—4, 5—5 and 6—6 of FIG. 2, respectively.

DETAILED DESCRIPTION OF A PREFERRED EMBODIMENT

With particular reference to the drawings, the numeral 10 designates an elongated base member of the instant invention. This base member includes a flat wall portion 12 arranged to lie flush on the side surface of a vehicle V and arranged to be secured to such surface by metal screws 14 or the like extending through apertures 16 therein. A shallow guide groove 18 is provided centrally along the length of the wall portion 12 for guided placement of holes 16 to be drilled in the base member. Base member 10 has side walls 20 forming a channel-like structure, the side walls 20 extending upwardly and inwardly in an arcuate configuration and terminating in free edges 22 spaced from each other.

Base member 10 is associated with end tips 24 tapered to a smaller dimension toward their outer ends and having a tongue portion 26 arranged to seat on top of wall portion 12 and be connected thereto by a screw 28 passing freely through the tongue and engaged with a threaded bore 30 in the wall portion 12. Each side of tip 24 has a notch 32 shaped like the walls 20 and the bottom of such tip also has a notch 34, whereby the base member has partial overlapping engagement with the tips to provide a sturdy connection and also to provide an attractive connection between these two members, the sides of the base member in its overlapping engagement with the tip ends being flush with the sides of said tip ends.

The tips 24 have a rearwardly facing wall surface 36, and the upper surface of tongue 26 has a barb 38 projecting therefrom. This barb has a flat surface 40 facing the wall surface 36 and an angled surface 42 on the other side. Surface 40 is substantially parallel with the surface 36 from its base to its tip end.

Base member 10 supports a bumper strip 46 constructed of a flexible material such as rubber, a resinous plastic, or other suitable material, and this bumper strip is substantially semi-circular in cross section, having a rounded surface 48 and a flat surface 50. The edges between the rounded surface 48 and flat surface 50 have full length grooves 52, the size and spacing of these grooves as well as the lateral dimension of the bumper strip being preselected such that the bumper strip can be installed on the base member by forcefully moving or snapping it into engagement with the wall edges 22. Furthermore, the length of the barbs 38 is such that when the bumper strip is forced into place, the sharpened ends of the barbs pierce a portion of this strip.

According to the present invention, the barbs 38 prevent the ends of the bumper strip 46 from drawing away from the wall surfaces 36, and thus preventing any gaps from developing, even though contraction forces act on the bumper strip as a result of cooling temperature changes. The barbs 38 are located close to the walls 36 so that there will be no appreciable shrinkage between the ends of the strip and the point engaged by the barbs and such close relationship also prevents the ends of the bumper strip from warping or turning away from the base member when contraction occurs. The hold provided by the snap-in connection between the bumper strip 46 and the base member 10 insures that the barbs will remain embedded in the bumper strip to hold the latter at its uniform length.

In the installation of the present invention, the selected length of base member 10 is cut and after the tips 24 are installed thereon, the bumper strip 46 is cut to a slightly less length than the distance between wall surfaces 36 and stretched into place with the ends thereof up against such wall surfaces. This pre-stretching prevents the bumper strip from buckling intermediate its ends if the temperature should get warmer than when installed.

It is to be understood that the form of our invention herein shown and described is to be taken as a preferred example of the same and that various changes in the shape, size and arrangement of parts may be resorted to without departing from the spirit of our invention or the scope of the subjoined claims.

Having thus described our invention, we claim:

1. A vehicle body molding assembly comprising
   (a) an elongated base member having a flat wall portion arranged to abut against a vehicle body surface,
   (b) means arranged to secure said base member in abutment with a vehicle body surface,
   (c) a side wall on each side of said flat wall portion forming a channel-like structure with open ends,
   (d) said side walls having outer defining edges,
   (e) an end tip arranged to be disposed adjacent at least one end of said base member,
   (f) said end tip having opposite ends and having a tongue portion projecting from one end thereof into an open end of said base member and lying flat on said flat wall portion,
   (g) means securing said tongue portion to said flat wall portion with an end of said tip closely adjacent an end of said base member,
   (h) a flexible bumper strip removably secured on said base member,
   (i) said bumper strip having full length side grooves and being dimensioned and arranged such that said strip has snap-on engagement with said outer defining edges of the side walls of said base member to accomplish said removable securement,
   (j) and anchor means on said end tip engageable with an end portion of said bumper strip for holding said end portion closely up against the adjacent end of said end tip regardless of contraction forces acting on said bumper strip as a result of temperature changes.

2. The vehicle body molding assembly of claim 1 wherein said end tip is notched on one side to receive an end portion of said flat wall portion and also is notched on two other sides to receive end portions of said side walls.

3. The vehicle body molding assembly of claim 1 wherein said anchor means comprise a barb on said tongue portion projecting into said flexible bumper strip in piercing relation when the latter is snapped in place, said barb being located closely adjacent to but spaced from the adjacent end of said tip, said barb having a flat surface substantially parallel with and facing said adjacent end and having an opposite angled surface forming the barb shape.

* * * * *